US006538540B2

(12) United States Patent
Oberndorfer et al.

(10) Patent No.: US 6,538,540 B2

(45) Date of Patent: Mar. 25, 2003

(54) MAGNETIC SYSTEM FOR AN ELECTROMAGNETIC RELAY

(75) Inventors: Johannes Oberndorfer, Miesbach (DE); Friedrich Plappert, Holzkirchen (DE); Herbert Elsinger, Unterhaching (DE)

(73) Assignee: Matsushita Electric Works (Europe) Aktiengesellschaft, Holzkirchen (DE)

( * ) Notice: Subject to any disclaimer, the term of this patent is extended or adjusted under 35 U.S.C. 154(b) by 0 days.

(21) Appl. No.: 09/906,823

(22) Filed: Jul. 18, 2001

(65) Prior Publication Data

US 2002/0021198 A1 Feb. 21, 2002

(30) Foreign Application Priority Data

Jul. 19, 2000 (DE) ........................................ 100 35 173
Mar. 5, 2001 (DE) ........................................ 101 10 467

(51) Int. Cl.$^{7}$ .............................................. H01M 51/22

(52) U.S. Cl. ........................................ 335/78; 335/267

(58) Field of Search ............................ 335/78–86, 124, 335/128, 265–269, 287–82

(56) References Cited

U.S. PATENT DOCUMENTS 4,833,435 A 5/1989 Ohara
5,264,812 A * 11/1993 Tomono et al. ............... 335/78

FOREIGN PATENT DOCUMENTS

| | | |
|---|---|---|
| DE | 221148 | 5/1962 |
| DE | 3705918 A1 | 9/1988 |
| DE | 4441171 C1 | 2/1996 |
| EP | 0792512 B1 | 9/1997 |

* cited by examiner

*Primary Examiner*—Lincoln Donovan
(74) *Attorney, Agent, or Firm*—Barnes & Thornburg

(57) ABSTRACT

A magnetic system for an electromagnetic relay comprises at least two iron pieces 15, 16 extending in parallel through the entire length of one common coil 18, each iron piece being part of its own magnetic circuit for operating an armature which is disposed in this magnetic circuit to operate ah associated contact system. The spacing between the iron pieces 15, 16 inside the coil 18 is substantially smaller than the largest cross-sectional dimension of each iron piece 15, 16 in order to make maximum use of the magnetic flux produced by the coil 18 with minimum loss and minimum stray flux.

16 Claims, 5 Drawing Sheets

FIG.1a
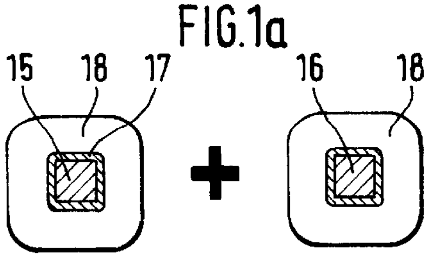
FIG.1b
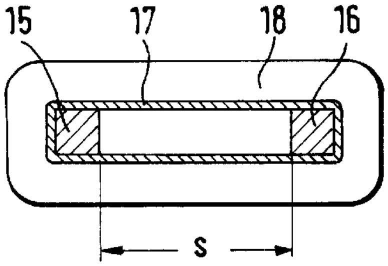
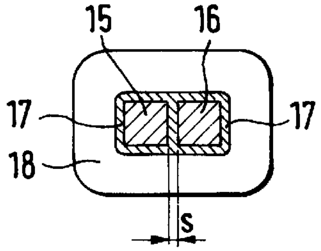
FIG. 1c
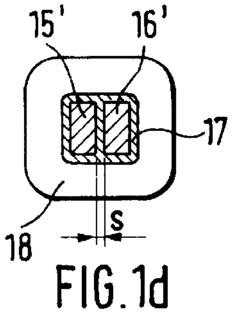
FIG. 1d
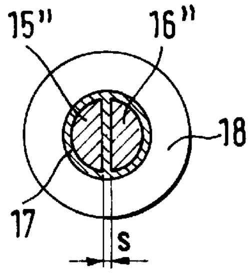
FIG. 1e
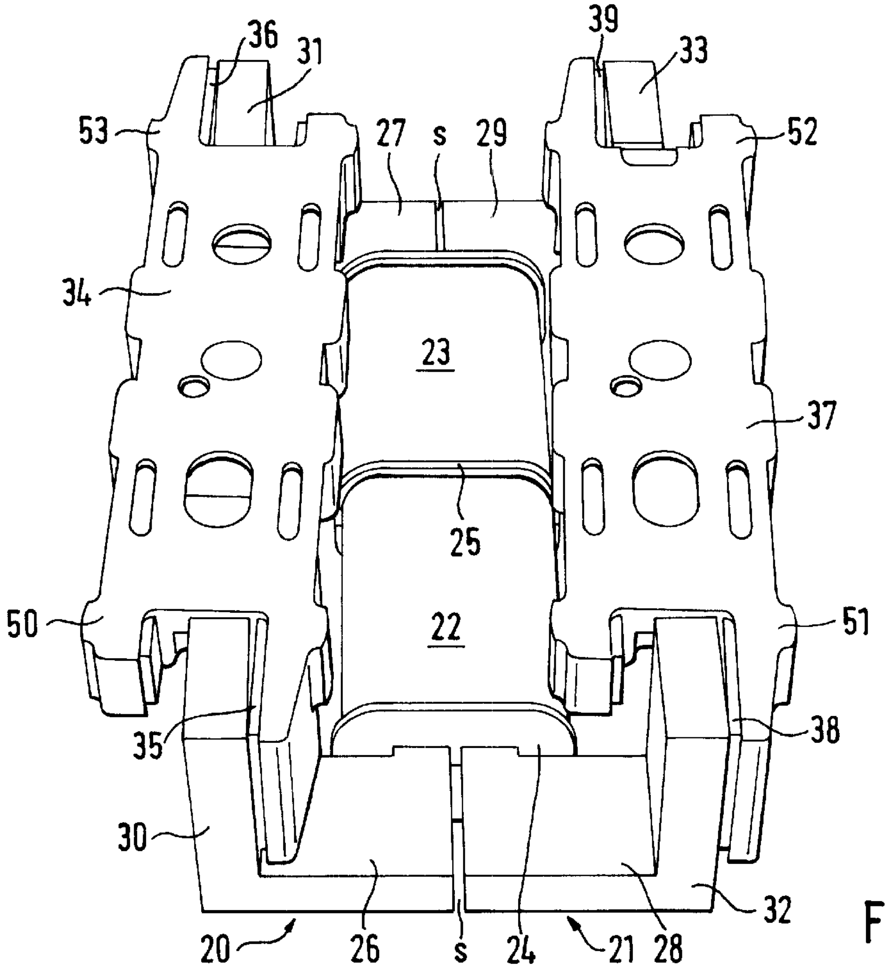
FIG. 2

MAGNETIC SYSTEM FOR AN ELECTROMAGNETIC RELAY

BACKGROUND OF THE INVENTION

In modern fail-safe circuits of the type used, for example, in supply circuits of machine tools, gates, furnaces and medical equipment, dual-channel switching on and off is required so that an inadvertent operation of only one channel will not result in the supply circuit being turned on. It is also required that when one channel fails, such as by contact welding, the other channel is still able to turn off.

An example of such a fail-safe circuit is found in DE 44 41 171 C1, This known circuit includes two relays with the coil of each relay being connected to a contact of the respective other relay in such a way that the relays will monitor each other, and ting on the supply circuit of the machine being controlled will take place only when both relays function properly. However, the presence of two relays renders the known circuit relatively complex.

DE 37 05 918 A1 discloses an electromagnetic relay having a magnetic system with a single coil penetrated by an iron piece of an overall U-shaped configuration. One leg of the iron piece is split in two parts so that two parallel magnetic circuits each having an associated clapper-type armature are provided on the same side of the coil. This arrangement is intended to ensure that if the contact driven by one armature undergoes contact welding, the entire magnetic flux will pass through this armature with the result that the other armature cannot be operated when the coil is energized a new. While this relay allows the switching of two circuits in a some what independent fashion, the separation between the, circuits is insufficient to satisfy the above-mentioned fail-safe requirements.

U.S. Pat. No. 4,833,435 describes an electromagnetic relay having a magnetic system with two separate U-shaped iron pieces extending in parallel through a common coil. Each iron piece is part of an individual magnetic circuit for operating an armature actuating a corresponding contact couple. The arrangement is intended to make sure that when one of the contact couples becomes welded, the other one can still open. This prior-art magnetic system suffers from high coil loss and from heat problems resulting therefrom.

AT 221 148 B discloses an electromagnetic relay with a coil surrounded by a shell-type two-piece yoke. Either yoke piece is formed of sheet iron by stamping and bending. Integrally formed with the yoke pieces are lugs which extend in parallel through the interior of the coil, Either yoke piece is provided with one or more clapper-type armatures which operate in synchronism upon energization of the coil. This type of relay is neither intended nor suited for the type of two-channel operation of fail-safe switching circuits referred to above.

SUMMARY OF THE INVENTION

It is an object of the invention to overcome at least part of the draw-backs existing with comparable prior-art magnetic systems for electromagnetic relays. It is a more specific object to provide a magnetic system for a relay which is suited for use in a fail-safe switching circuit at small coil losses.

To meet this object, the invention provides a magnetic system for an electromagnetic relay, comprising a coil arrangement defining a coil axis, and at least two magnetic circuits, each magnetic circuit including an iron piece and an armature, for operating an associated contact system, wherein the iron pieces are magnetically separated and extend parallel to the coil axis through the entire length of the coil arrangement, wherein the spacing between the iron pieces inside the coil arrangement is substantially smaller than the largest cross-sectional dimension of any one of the iron pieces.

In the present specification, the term "iron piece" is used to designate the overall structure of that component of the magnetic system which includes a portion ("core") extending inside and through the relay coil or coils, and portions ("yokes") extending from the coil and cooperating with a relay armature.

Due to the close arrangement of the iron pieces inside the coil arrangement, a small coil cross-section, thus small coil losses, can be realized, essentially all of the magnetic flux produced by the coil arrangement is coupled into the magnetic circuit and available for actuating the armatures, and stray fluxes are largely avoided.

Surprisingly, it has turned out that inspite of the close arrangement of the iron pieces, the magnetic circuits are sufficiently uncoupled to obtain the kind of independent switching behavior of the contact systems operated by these circuits that is required for fail-safe circuits.

The small coil loss which results from the small cross-section of the coil arrangemnent and the fact the magnetic flux is used by more than one magnetic circuit, and the reduction of stray fluxes lead to the further advantage that heat problems are reduced.

In accordance with a preferred embodiment, the iron pieces are shaped and disposed relative to each other so as to minimize the ratio of their overall circumference to their total area. The overall cross-section encompassing the iron pieces and the spaces therebetween is preferably square or, ideally, circular, thereby optimising the efficiency in making maximum use of the magnetic flux produced by the coil arrangement.

In another embodiment, the magnetic circuits lie in planes which are defined by the coil axis and the respective one of the armatures and are equi-angularly distributed round the coil axis. This results in a spatially uniform distribution of the magnetic flux, thus in a further optimization concerning coil losses.

It is of advantage for the use of the magnetic system in many relay applications if each magnetic circuit contains a permanent magnet.

In another embodiment, each armature is substantially H-shaped and mounted for pivotal movement about a bearing axis extending perpendicular to the coil axis, and includes two armature plates constituting parallel legs of the H-shape, with a permanent magnet being disposed between these legs. Coupling the magnetic flux of the coil to the individual magnetic circuits is thus facilitated.

Preferably in this embodiment, two magnetic circuits are provided, the bearing axes of the armatures are coaxial, and their permanent magnets are oppositely magnetized. Forces generated on actuation of the magnetic system are thereby balanced.

In yet another embodiment, each magnetic circuit includes a permanent magnet extending substantially parallel to the coil axis between ends of a C-shaped iron piece, the permanent magnet having an intermediate pole and two end poles of a polarity opposite to that of the intermediate pole, and an armature mounted for pivotal movement at an intermediate location of the permanent magnet.

In another preferred arrangement, four magnetic circuits are provided which lie in two substantially perpendicular planes.

In accordance with a further embodiment of the present invention, two magnetic circuits are provided, and the coil arrangement includes two coils adapted to be independently energized, the armatures being so arranged that both of them are actuated only when both coils are energized. In case of energization of only one coil, at most one armature will respond. Faulty operation of a power circuit provided with the relay may be prevented by proper wiring of the relay contact assembly similar to conventional fail-safe circuits. While the magnetic circuits have approximately similar responsiveness, no switching operation takes place if only one coil is energized; i.e., inadvertent energization will have no effect. It is only by energising both coils that both armatures will be operated.

If the armatures including their associated contact assemblies are difeferent in responsiveness, the additional advantage of a defined attraction sequence of the two armatures is achieved. For instance, the armature exhibiting lower responsiveness may be provided for operating a contact assembly designed to carry load current. At the same time, failure can be detected from fact that the armature with the higher responsiveness operates. Different responsiveness may be realized by different magnetization or spring characteristics or by non-symmetrical coil windings or by combinations of these measures.

The coil winding process is simplified if the coils are adapted to generate identical magnetic fluxes. Different coils, on the other hand, would permit varying the excitation necessary to hold the relay in its operative condition.

In accordance with another embodiment, at least one of the coils is adapted to generate a magnetic flux sufficient to hold both armatures in their operative positions. In this case, the relay may be operated such that the holding current required for the armatures is reduced and, consequently, loss and heat generation may also be reduced.

BRIEF DESCRIPTION OF THE DRAWINGS

An embodiment of the invention will now be explained with reference to thee accompanying drawings in which:

FIGS. 1*a* to 1*e* are cross-sectional views of magnetic coils and iron pieces extending therethrough;

FIG. 2 is a perspective schematic view of a magnetic system of the invention in the rest condition;

DESCRIPTION OF PREFERRED EMBODIMENTS

Figure 3:
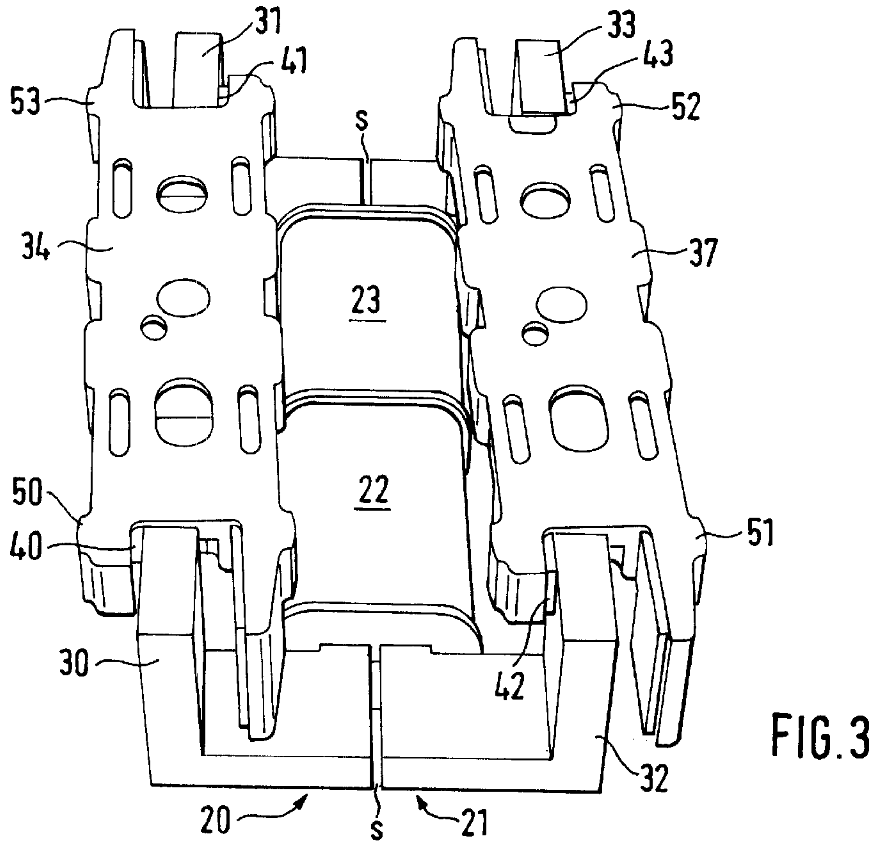
FIG. 3 shows the magnetic system with both coils energized.

FIG. 1*a* schematically illustrates a case where two relays are used, each including an iron piece 15, 16 of square cross-section, an encasing 17 of synthetic resin, and a coil 18. With a given number of ampere-turns of the coil 18 for operating a given contact system, and a corresponding cross-sectional area of each iron piece 15, 16 (which area is dimensioned so that saturation is avoided), each coil is assumed to draw a power of 500 mW, which results in a total power of 1000 mW.

FIG. 1*b* illustrates the situation with a prior-art relay such as known from U.S. Pat. No. 4,833,435. The considerable spacing s between the iron pieces 15, 16 results in the coil 18 requiring a power that is not smaller than in the case of two separate coils as shown in FIG. 1*a*, and may actually reach up to 1200 mW.

FIG. 1*c* diagrammatically illustrates a structure according to the present invention in which two iron pieces 15, 16 of square cross-section are disposed close to each other to result in a coil 18 of an overall rectangular cross-section and a power of approximately 650 mW.

The arrangements of FIGS. 1*d* and 1*e* are further optimized in that the cross-section of the coil, thus the power drawn by the coil, is further reduced even though the cross-sectional area of each iron piece remains the same. FIG. 1*d* shows two iron pieces 15', 16' of rectangular cross-section which result in an overall square cross-section and in a power of the coil 18 of about 625 mW, while the overall circular cross-section of the iron pieces 15", 16" (as shown in FIG. 1*e*) result in a coil 18 having a power requirement of only 595 mW.

In the structures schematically illustrated in FIGS. 1*a* to 1*e*, it has, been assumed that the magnetic flux passing through each iron piece is always the same. The arrangements according to the present invention illustrated in FIGS. 1*c* to 1*e* result in a coil of minimum cross-section, thus minimum coil loss.

Embodiments of electromagnetic relays using the magnetic system of the present invention will now be described.

The magnetic system illustrated in FIG. 2 comprises two iron pieces 20, 21 the intermediate portions of which extend in parallel at a mutual spacing s and together pass through two coils 22, 23 disposed along the same axis. In the embodiment, the two coils 22, 23 are wound on a common bobbin 24 including an intermediate insulating flange 25. The legs 26, 27 of the iron piece 20 which project from the bobbin 24 and the corresponding legs 28, 29 of the iron piece 21 extend in opposite directions, with their ends bent upward to form pole shoes 30 . . . 33.

A rotary armature 34is mounted between the pole shoes 30, 31 of the iron piece 20 for rotation about its vertical centre axis. In the rest condition of the magnetic system illustrated in FIG. 2, where the coils 22, 23 are not energized, the large armature pole faces 35, 36 of the armature 34 engage the pole shoes 30, 31 of the iron piece 20. Similarly, a rotary armature 37 is mounted between the pole shoes 32, 33 of the other iron piece 21 for rotation about its vertical centre axis, the large armature pole faces 38, 39 of the armature 37 in the rest position engaging the pole shoes 32, 33.

In the present embodiment, the coils 22, 23 as well as the iron pieces 20, 21 are of identical structure and arranged symmetrical to each other. Further, the armatures 34, 37 are identically structured and arranged, but the armature 34 has a higher responsiveness than the armature 37. This will be discussed in detail below in conjunction with FIG. 4. Alternatively, and depending on the requirements of the particular application, the iron pieces 20, 21 and the coils 22, 23 may be non-symmetrical.

In the position illustrated in FIG. 3, both coils 22, 23 are energized. Their magnetic fluxes, which have the same direction and intensity, are distributed to both iron pieces 20, 21 so that one-half of the entire magnetic flux generated is available for operating either one of the armatures 34, 37. Due to the forces acting between the pole shoes 30, 31 and the small armature pole faces 40, 41 of the left-hand (in FIG. 3) armature 34, and between the pole shoes 32, 33 and the small armature pole faces 42, 43 of the right-hand armature 37, respectively, the armatures have been rotated counter-clockwise and now take the positions indicated in FIG. 3.

Figure 4:
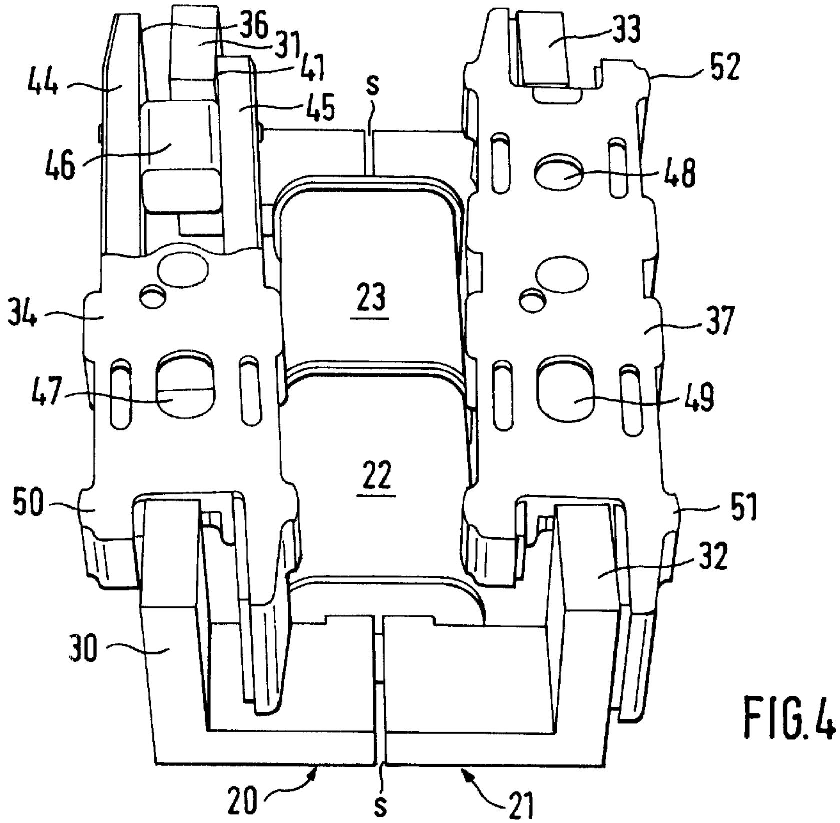
FIG. 4 shows the magnetic system with only one coil energized.

FIG. 4 illustrates the condition in which only coil 22 or only coil 23 has been energized. As before, the magnetic flux generated by the energized coil 22 or 23 is distributed substantially equally to the two iron pieces 20, 21.

In the present embodiment, the higher responsiveness assumed for the left-hand armature 34 is obtained by the fact that the permanent magnets 46, 47, which are disposed between two armature plates 44, 45 and hold the armature 34 in the rest position, are smaller or weaker than the permanent magnets 48, 49 provided at corresponding locations in the right-hand armature 37.

The magnetic fluxes generated by the coils 22, 23 and the strength of the permanent magnets 46 . . . 49 are chosen so that, upon energization of only one coil 22 or 23, only the left-hand armature 34 having higher responsiveness will be operated whereas the less responsive right-hand armature 37 will remain in its rest position. This switching state may be detected, for instance, by contacts (not shown) which are operated by the armatures. Operation of such contacts is through actuators (not shown) which bear against actuating elements 50 . . . 53 formed on the armature.

Alternatively, different responsiveness may be obtained by the use of different spring loads instead of providing the armatures 34, 37 with permanent magnets 46 . . . 49 of different strengths.

As a result of the non-symmetry in the responsiveness of the two rotary armatures 34, 37 explained with reference to FIG. 4, only one of them will respond when only one of the coils 22, 23 is energized, as may occur due to failure. As a further result of this non-symmetry, when the energization of both coils 22, 23 commences, it is first the left-hand armature 34 and only thereafter the right-hand armature 37 that is rotated to the operative position This behavior may be used to cause the contact couple, which switches the load current, to be actuated by the later operated armature 37.

If, upon energization of both coils 22 and 23, both rotary armatures 34 and 37 have been moved to their operative positions illustrated in FIG. 3, one of the coils 22 or 23 may be turned off. The reduced magnetic flux generated by the coil remaining energized is sufficient to hold the armatures 34, 37 in their operative positions. Alternatively, the magnetic flux of either one of the coils may be reduced by closing contacts which place resistors in series with the coil energising circuits, thereby reducing power dissipation.

The magnetic system of FIGS. 5 to 8 comprises a coil 59 with an H-shaped coil core 61, 62 extending through a bobbin 60. The parts of the iron pieces 61, 62 extending through the coil 59 are parallel and at a small spacing s. As viewed in FIG. 5, the two parallel legs of the iron piece 61 form an upper pair of front coil pole surfaces 63, 66 and an upper pair of rear coil pole surfaces 64, 65; the legs of the iron piece 62 form a lower pair of front coil pole surfaces 63', 66' and a lower pair of rear coil pole surfaces 64', 65'.

The coil 59 is surrounded by a two-part coil case the upper part 67 of which has an upward extending journal 68, whereas the lower half 67', which has a shape identical to that of the upper half 67, has a downward extending journal 68' which is coaxial with the journal 68. Upper and lower armatures 70, 70' of a somewhat H-shaped overall configuration are mounted for pivotal movement on the respective journals 68, 68'

The armature 70 comprises two armature plates 71, 72 (compare FIG. 8) which form the parallel legs of the H shape and sandwich two permanent magnets 73, 73'. The armature components 71 to 73 are largely surrounded and held together by a casing 74 of synthetic material.

Figure 5:
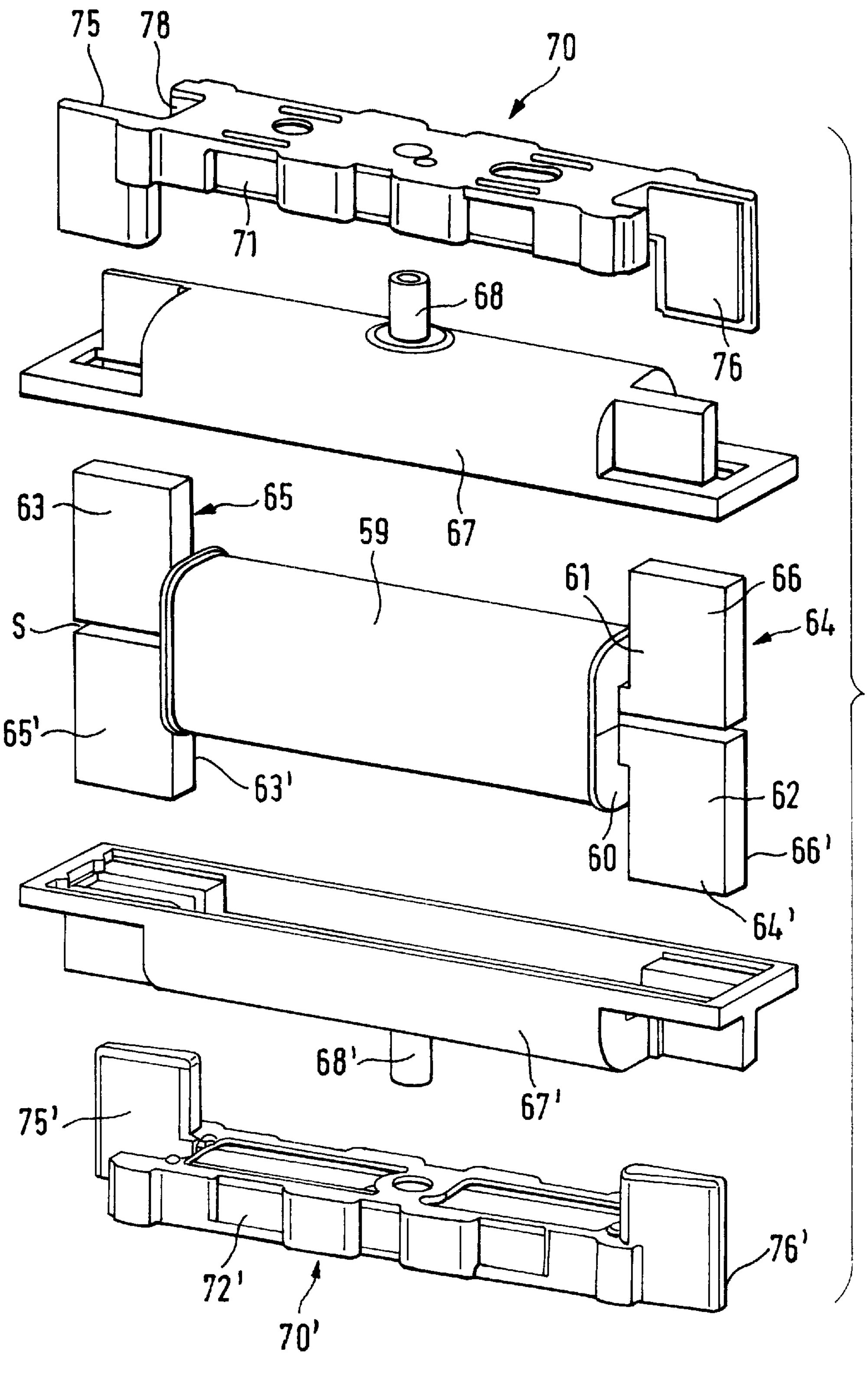
FIGS. 5 and 6 are schematic exploded views of a magnetic system having two rotary armatures.
Figure 6:
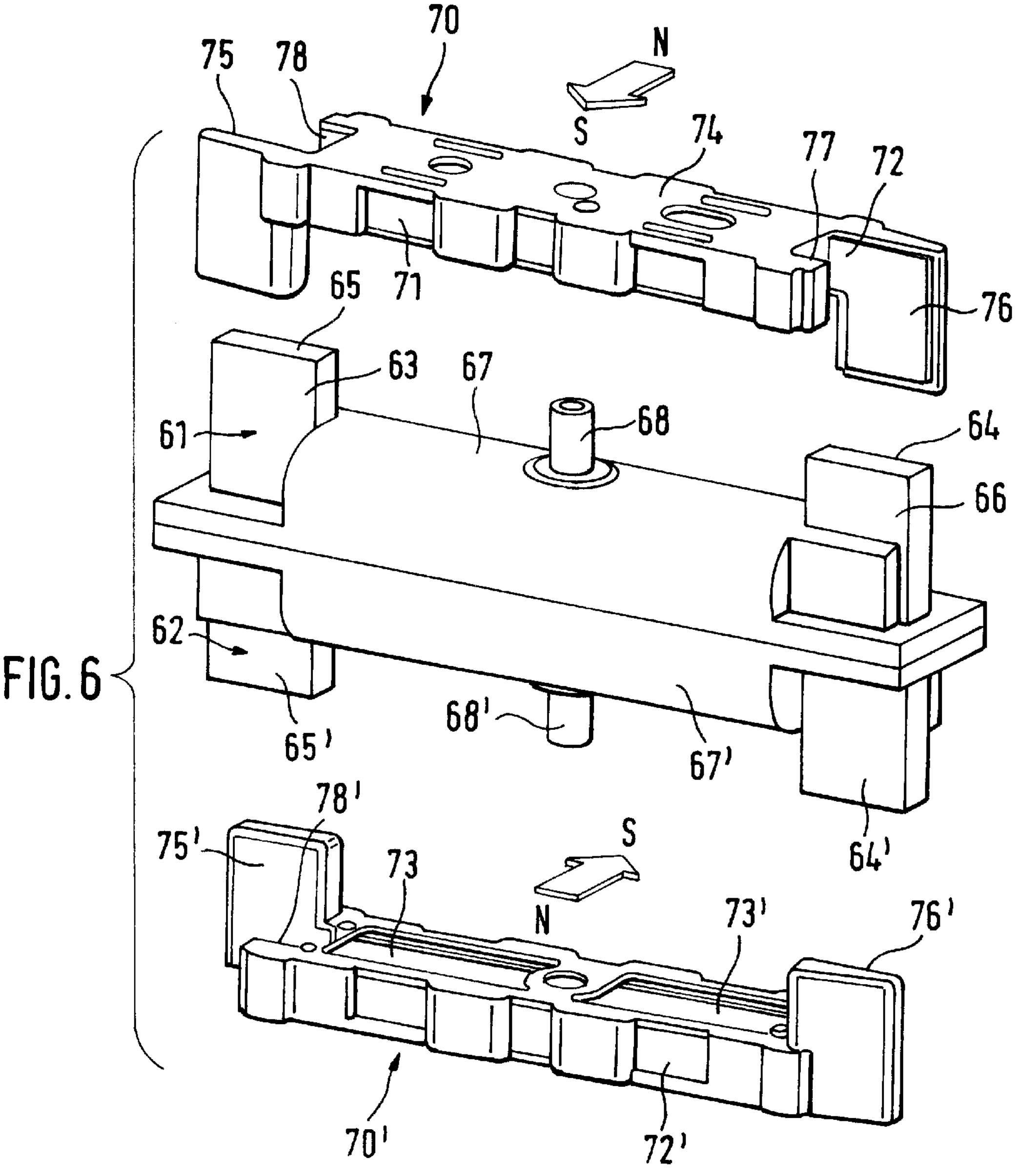
Figure 7:
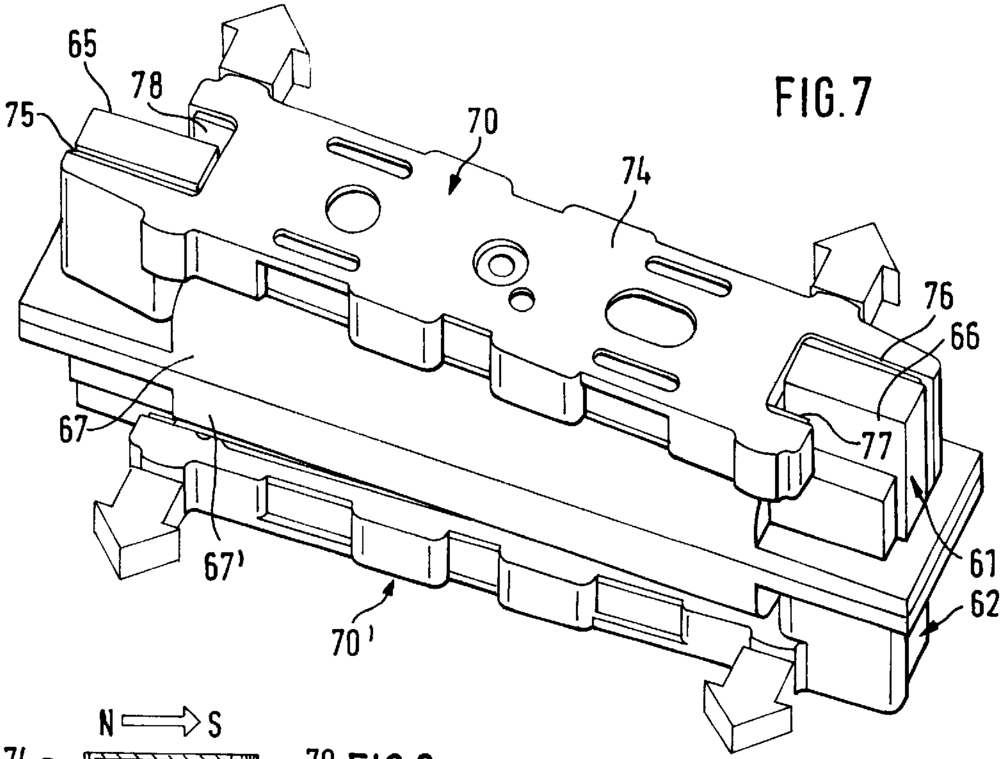
FIG. 7 is a perspective view of the magnetic system of FIGS. 5 and 6 in the assembled condition.

The left-hand end of the front armature plate 71, as seen in FIGS. 5 to 7, projects downward from the casing 74 and constitutes a large armature pole surface 75, whereas the left-hand end of the rear armature plate 72 is exposed only in a short portion and forms a small armature pole surface 78. Similarly, the right-hand end of the armature plate 72 projects downward from the casing 74 and forms a large armature pole surface 76, while the right-hand end of the armature plate 71 is exposed only in a short portion and forms a small armature pole surface 77. In the assembled condition, the large armature pole surfaces 75, 76, which face the longitudinal centre plane of the armature 70, oppose the upper coil pole surfaces 63, 64 of the iron piece 61, and these surfaces have approximately the same size.

Figure 8:
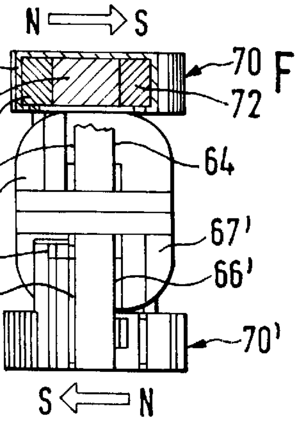
FIG. 8 is an end view, partially in cross section, of the magnetic system of FIG. 7.

The lower armature 70' is formed identically with respect to the upper armature 70, with the large armature pole surfaces 75', 76', which face the longitudinal centre plane of the armature 70', oppose the lower coil pole surfaces 63' and 64', respectively, of the iron piece 62. The identical shape of the two armatures 70, 70' results in opposite polarizations of the permanent magnets 73, 73', as indicated in FIGS. 6 and 8.

As will be apparent from the above description, the magnetic system of FIGS. 5 to 8 constitutes two magnetic circuits, one of which includes the iron piece 61 with the upper coil pole surfaces 63, 64, 65 and 66, and the upper armature 70, and the other one of which includes the iron piece 62 with the lower coil pole surfaces 63', 64', 65' and 66', and the lower armature 70'. The magnetic circuits thus constituted are in planes distributed by 180° around the coil axis (i.e. in the same geometric plane, in this embodiment).

The embodiment of FIGS. 5 to 8 relates to a monostable magnetic system. In the rest position shown in FIG. 7, with the coil 59 being de-energized, the large armature pole surfaces 75, 76 abut the upper coil pole surfaces 63, 64, and the large armature pole surfaces 75', 76' abut the lower coil pole surfaces 63', 64'. When the coil 59 is energized so as to produce a S pole at the coil pole surfaces 63, 63', 65, 65' and a N Pole at the coil pole surfaces 64, 64', 66, 66', the two armatures 70, 70' are pivoted in opposite directions into their operative positions in which the small armature pole surfaces 77, 78 of the armature plates 71, 72 abut the coil pole surfaces 65, 66, and the small armature pole surfaces 77', 78' of the armature plates 71', 72' abut the coil pole surfaces 65', 66'.

The movement of the armatures 70, 70' may be transferred to sets of contact springs of an electromagnetic relay at the locations indicated by big arrows in FIG. 7. The figure assumes that each armature 70, 70' actuates two contact springs, for instance in such a manner that one relay contact is open and one is closed in either position of the armature.

When the coil 59 is switched off, the armatures 70, 70' will return to their rest positions shown in FIG. 7, because the magnetic system is monostable and the attractive forces between the coil pole surfaces 63, 64, 63', 64' and the large armature pole surfaces 75, 76, 75', 76' are substantially greater than those between the coil pole surfaces 65, 66, 65', 66' and the small armature pole surfaces 77, 78, 77', 78'.

The above-mentioned opposite rotation of the two armatures 70, 70' upon energization and de-energization of the coil 59 results in a compensation of forces and moments occurring in the magnetic system, so that no forces are transmitted to the outside when the system is actuated.

In a modification not shown, the permanent magnets provided in the armatures may be polarized in the same direction so that the armatures rotate in the same sense when the coil is energized. In this case, the two armatures may be ganged.

Figure 9:
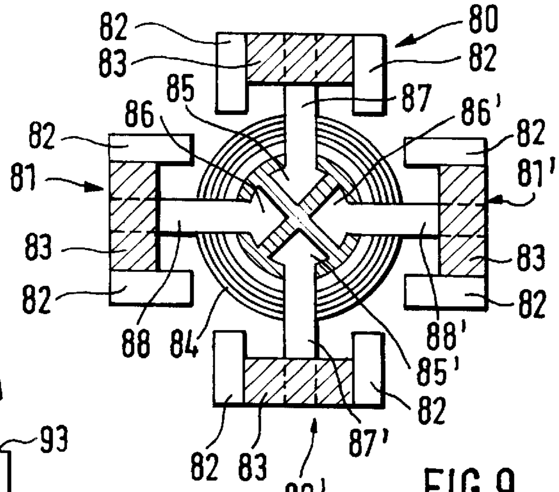
FIG. 9 is a schematic view of a polarized magnetic system having four armatures.

The schematic view of FIG. 9 relates to a magnetic system which may have the same principal structure as shown in FIGS. 5 to 8, but has four rotary armatures 80, 80', 81, 81' disposed around the coil axis at angles of 90° each. As illustrated, each armature has two armature plates 82 sandwiching a permanent magnet 83.

Axially extending through the coil 84 are four C-shaped iron pieces 85, 85', 86, 86' the intermediate portions of which have sector shaped cross-sections and together fill the internal cross-section of the coil 84 completely, with the exception of small mutual spaces and a common encasing (not shown). The yoke legs 87, 87', 88, 88' extending from the coil 84 perpendicularly to the coil axis are disposed between the ends of the respective armature plates 82.

In this case, the magnetic system constitutes four magnetic circuits each of which includes one of the iron pieces 85, 85', 86, 86' extending through the same coil 84, and one of the rotary armatures 80, 80', 81, 81'. The thus formed magnetic circuits lie in planes distributed 90° around the coil axis (thus lying in two geometric planes).

Figure 10:
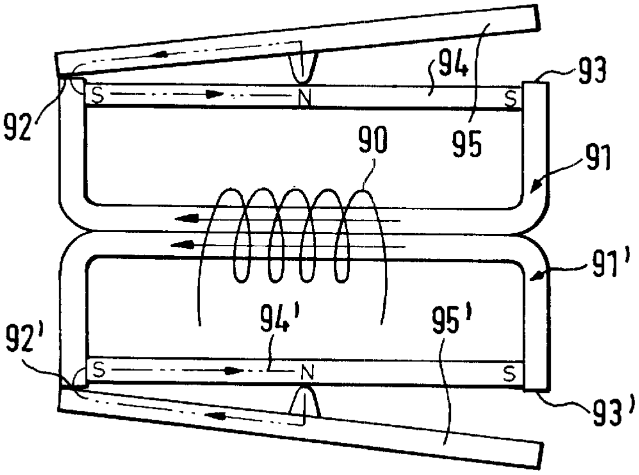
FIG. 10 is a schematic view of a polarized magnetic system having two armatures.

In the polarized magnetic system schematically shown in FIG. 10, two C-shaped iron pieces 91, 91' extend through the coil 90, with the respective coil pole surfaces 92, 92' and 93, 93' facing in opposite directions. The intermediate portions of the iron pieces 91, 91' disposed inside the coil 90 are shape so that-they together form square cross-section as shown in FIG. 1*d*.

A permanent magnet 94, which is disposed between the ends of the iron piece 91 and extends parallel to the axis of the coil 90, is magnetized to have a central N pole and one S pole at either end. A rod-shaped armature 95 is pivotally mounted at the centre of the permanent magnet 94 in such a way that, in either end position, a respective one of its ends abuts the respective coil pole surface 92, 93.

Just as in FIGS. 5 and 8, the magnetic system shown in FIG. 10 constitutes two magnetic circuits lying in planes distributed 180° around the coil axis (i.e. lying in the same geometric plane).

The magnetic system of FIG. 10 is bistable. In the position shown, in which the coil 90 is switched off, the armature 95 is retained in the end position shown by the magnetic flux of the permanent magnet 94. When the coil 90 is energized so that it generates a N pole at the coil pole surface 92, the left-hand end of the armature 95 in FIG. 10 is repelled from the coil pole surface 92 and is thrown into the opposite position of abutment at the coil pole surface 93 in which it is retained by the permanent magnet 94 when the coil 90 is switched off.

The same behavior applies to the lower magnetic circuit, which is identical to the upper one and includes an iron piece 91' with coil pole surfaces 92', 93', a permanent magnet 94' and an armature 95'.

The magnetic system of FIG. 10 may be changed to a monostable system by an off-centre magnetization of the magnets 94, 94'.

In accordance with a modification not shown, the magnetic system of FIG. 10 may be non-polarized. In that case, the permanent magnets 94, 94' are omitted and the armatures 95, 95' are pivotally mounted with one of their ends at the respective coil pole surface, rather than at an intermediate location.

Instead of arranging two armatures on opposite sides of the coil, as shown in FIGS. 5 to 8 and 10, or distributing four armatures equi-angularly around the coil axis, as shown in FIG. 9, magnetic systems may be devised with three or more than four magnetic circuits disposed equi-angularly around the coil axis. In each case, the spatially distributed and uniform arrangement of the iron pieces leads to the effect that the total magnetic flux generated by the coil is multiply used and coil losses are minimized. Cross-talk between the magnetic circuits results is negligible, and stray fluxes are minimal.

What is claimed is:

1. A magnetic system for an electromagnetic relay, comprising:

a coil arrangement defining a coil axis, and at least two magnetic circuits each including an iron piece and an armature, for operating an associated contact system, wherein said iron pieces are magnetically separate and extend parallel to said coil axis through the entire length of said coil arrangement, and wherein the spacing between said iron pieces inside said coil arrangement has a cross-sectional area smaller than the cross-sectional area of any one of said iron pieces.

2. A magnetic system for an electromagnetic relay, comprising:

a coil arrangement defining a coil axis, and at least two magnetic circuits each including an iron piece, an H-shaped armature mounted for pivotal movement about an axis extending perpendicular to the coil axis, for operating an associated contact system, the armature including two armature plates constituting parallel legs of the H-shape, and a permanent magnet disposed between said legs; and the iron pieces being magnetically separate, extending parallel to said coil axis through the entire length of said coil arrangement and being spaced inside said coil arrangement.

3. A magnetic system for an electromagnetic relay, comprising:

a coil arrangement defining a coil axis, and at least two magnetic circuits each including an iron piece, an H-shaped armature mounted for pivotal movement about an axis extending perpendicular to the coil axis, for operating an associated contact system, the armature including two armature plates constituting parallel legs of the H-shape, and a permanent magnet disposed between said legs; and the iron pieces being magnetically separate, extending parallel to said coil axis through the entire length of said coil arrangement and being spaced in a plane inside said coil arrangement by a smaller amount than the largest cross-sectional area of any one of the iron pieces in the plane.

4. The magnetic system of claim 1, wherein the iron pieces are shaped and disposed relative to each other so as to minimize the ratio of the overall circumference encompassing the iron pieces to their total area.

5. The magnetic system of claim 1, wherein the cross-section encompassing said iron pieces and the spaces therebetween is substantially square.

6. The magnetic system of claim 1, wherein the overall cross-section encompassing said iron pieces and the spaces therebetween is substantially circular.

7. The magnetic system of claim 1, wherein said magnetic circuits lie in planes defined by said coil axis and the respective one of said armatures, and said planes are equally spaced around said coil axis.

8. The magnetic system of claim 1, wherein each said magnetic circuit contains a permanent magnet.

9. The magnetic system of claim 2, wherein two magnetic circuits are provided and the axes of said armatures are coaxial.

10. The magnetic system of claim 8, wherein the permanent magnets of said armatures are oppositely magnetized.

11. The magnetic system of claim 1, wherein each said magnetic circuit includes a permanent magnet extending substantially parallel to said coil axis between ends of a C-shaped iron piece, said permanent magnet having an intermediate pole and two end poles of a polarity opposite to that of said intermediate pole, and an armature mounted for pivotal movement at an intermediate location of said permanent magnet.

12. The magnetic system of claim 1, wherein four magnetic circuits are provided which lie in two substantially perpendicular planes.

13. The magnetic system of claim 1, wherein two magnetic circuits are provided and said coil arrangement includes two coils independently energizable, said armatures being so arranged that both of them are operated only when both coils are energized.

14. The magnetic system of claim 13, wherein said armatures including their associated contact assemblies are different in responsiveness.

15. The magnetic system of claim 13 wherein said coils generate identical magnetic fluxes.

16. The magnetic system of claim 13, wherein at least one of said coils generates a magnetic flux sufficient to hold both said armatures in their operative positions.

* * * * *